(12) United States Patent
Jha et al.

(10) Patent No.: US 10,086,952 B2
(45) Date of Patent: Oct. 2, 2018

(54) AT LEAST PARTIALLY TRANSPARENT EXTERIOR AIRCRAFT LIGHT COVER AND EXTERIOR AIRCRAFT LIGHTING DEVICE COMPRISING THE SAME

(71) Applicant: Goodrich Lighting Systems GmbH, Lippstadt (DE)

(72) Inventors: Anil Kumar Jha, Lippstadt (DE); Andre Hessling-Von Heimendahl, Koblenz (DE)

(73) Assignee: GOODRICH LIGHTING SYSTEMS GMBH, Lippstadt (DE)

(*) Notice: Subject to any disclaimer, the term of this patent is extended or adjusted under 35 U.S.C. 154(b) by 0 days.

(21) Appl. No.: 15/080,634

(22) Filed: Mar. 25, 2016

(65) Prior Publication Data

US 2016/0280395 A1 Sep. 29, 2016

(30) Foreign Application Priority Data

Mar. 26, 2015 (EP) .................................. 15161052

(51) Int. Cl.
| B64D 47/02 | (2006.01) |
| B64D 47/06 | (2006.01) |
| F21V 5/04 | (2006.01) |
| F21V 17/10 | (2006.01) |
| F21V 31/00 | (2006.01) |

(52) U.S. Cl.
CPC ............ *B64D 47/06* (2013.01); *B64D 47/02* (2013.01); *F21V 5/045* (2013.01); *F21V 17/107* (2013.01); *F21V 31/005* (2013.01); *B64D 2203/00* (2013.01)

(58) Field of Classification Search
CPC .... B64D 47/06; B64D 47/02; B64D 2203/00; F21V 5/045; F21V 17/107; F21V 31/005; F21V 17/10; F21V 17/12; F21V 17/16

USPC ......................................................... 362/470
See application file for complete search history.

(56) References Cited

U.S. PATENT DOCUMENTS

| 2005/0093718 A1* | 5/2005 | Martin ................... B64D 47/06 340/981 |
| 2007/0014102 A1* | 1/2007 | Drane ...................... H02G 3/20 362/153 |

FOREIGN PATENT DOCUMENTS

| GB | 239688 A | 9/1925 |
| GB | 320730 A | 10/1929 |
| GB | 332163 A | 7/1930 |

OTHER PUBLICATIONS

European Search Report for application No. EP15161052.4 ; dated Sep. 14, 2015, 6 pages.

\* cited by examiner

*Primary Examiner* — Paultep Savusdiphol
(74) *Attorney, Agent, or Firm* — Cantor Colburn LLP

(57) ABSTRACT

An at least partially transparent exterior aircraft light cover includes at least one protrusion provided at a lateral end of the exterior aircraft light cover, wherein the at least one protrusion is configured to be introduced into a corresponding reception provided at an exterior aircraft light casing and wherein the protrusion is formed for allowing the cover to pivot, with the protrusion providing a fulcrum, when the protrusion is introduced into the reception. The at least partially transparent exterior aircraft light cover further includes at least one fixing device, which is provided in a pivotable portion of the cover and which is configured for removably fixing said pivotable portion to the casing for preventing a pivoting motion thereof.

16 Claims, 5 Drawing Sheets

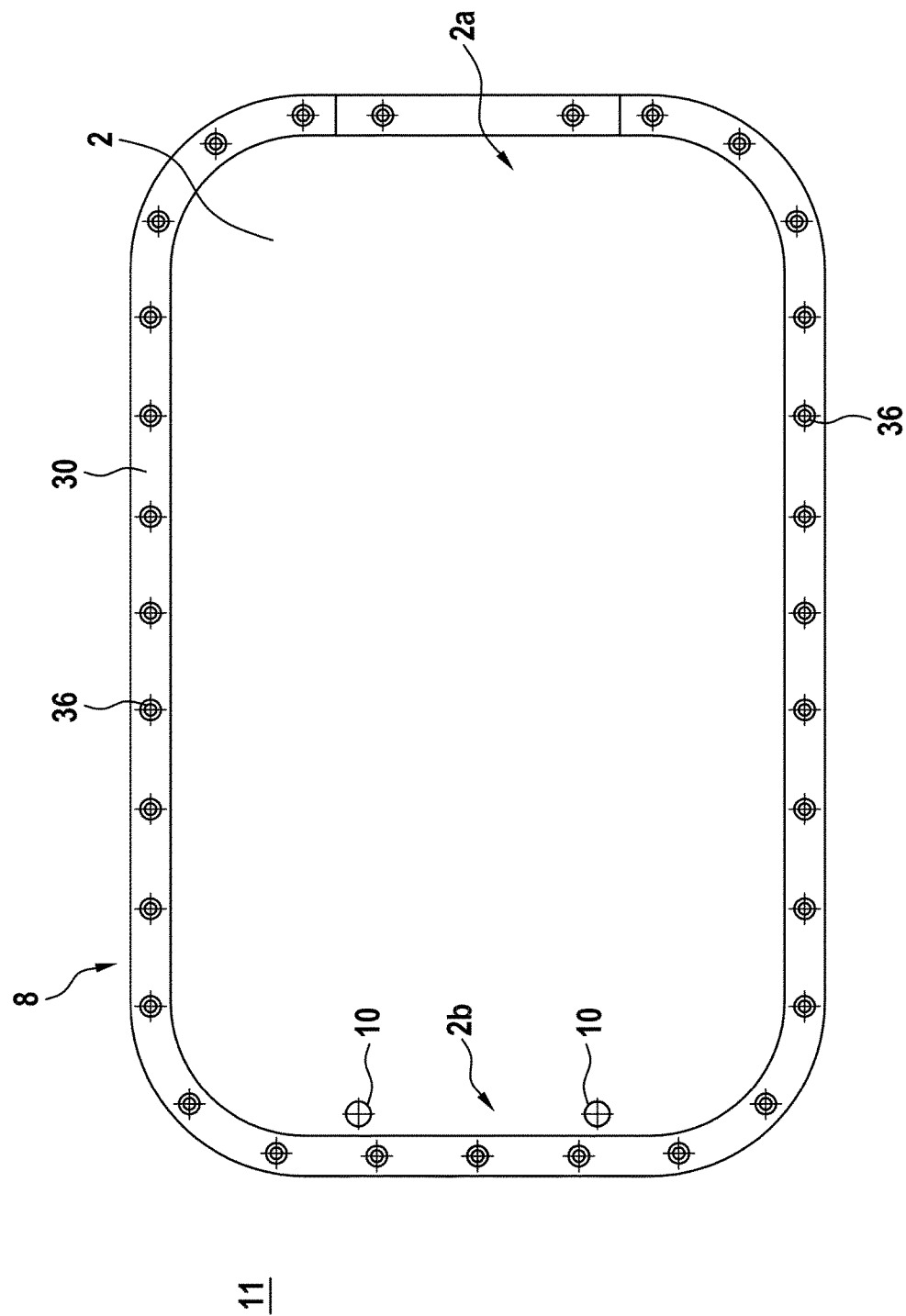

AT LEAST PARTIALLY TRANSPARENT EXTERIOR AIRCRAFT LIGHT COVER AND EXTERIOR AIRCRAFT LIGHTING DEVICE COMPRISING THE SAME

FOREIGN PRIORITY

This application claims priority to European Patent Application No. EP 15 161 052.4 filed Mar. 26, 2015, the entire contents of which is incorporated herein by reference.

TECHNICAL FIELD

The present invention relates to an at least partially transparent cover for an exterior aircraft lighting device and an exterior aircraft lighting device comprising such a cover.

BACKGROUND OF THE INVENTION

Almost all aircraft have exterior lights. In particular, large passenger air planes have a wide variety of exterior lights. Examples are navigation lights or position lights, beacon lights, anti-collision lights or strobe lights, wing lights, taxi lights, landing lights, runway turnoff lights, etc. Many of these lights are arranged on the exterior of the aircraft's wings and fuselage, where they are exposed to the airstream flowing along the aircraft's exterior. Said airstream includes solid particles, as e.g. dust, causing wear of the lights' exterior, in particular of the lights which are exposed to a head-on airstream. In consequence, the lights' covers exposed to the airstream need to be regularly replaced, in order to maintain the necessary illumination quality provided by the lights. Up to now, changing said covers and re-establishing the sealing has been work-intensive and time consuming, causing long grounding and maintenance times of the aircraft.

Accordingly, it would be beneficial to provide exterior aircraft light covers that can be replaced faster and more easily in order to reduce the aircraft's grounding time and to minimize the costs for maintenance.

SUMMARY

Exemplary embodiments of the invention include an at least partially transparent exterior aircraft light cover that comprises at least one protrusion provided at a lateral end of the exterior aircraft light cover, said at least one protrusion being configured to be introduced into a corresponding reception provided at an exterior aircraft light casing for attaching the cover to the casing. The protrusion has a shape which allows the cover to pivot, when the protrusion is introduced into the reception, with the protrusion acting as a fulcrum. The at least partially transparent exterior aircraft light cover further comprises at least one fixing device provided in a pivotable portion of the cover and configured for removably fixing said pivotable portion to the casing, preventing a pivoting motion thereof, for sealably closing the casing.

Exemplary embodiments of the invention further include an exterior aircraft lighting device that comprises an exterior aircraft light casing, which is configured to be fixed to an aircraft and has an open side facing the aircraft's exterior. The exterior aircraft lighting device further comprises an at least partially transparent exterior aircraft light cover, as described in any of the embodiments of the invention presented herein, which is configured for being arranged at the open side for sealably closing the exterior aircraft light casing. The exterior aircraft light casing is provided with at least one reception configured for receiving the cover's at least one protrusion. The reception in particular may have the form of a notch or groove.

An at least partially transparent exterior aircraft light cover according to an exemplary embodiment of the invention may be installed and changed easily, even at low temperatures and potentially without the need of using any tools. This allows to reduce the aircraft's grounding time and costs for maintenance considerably. In addition, the risk of operating the aircraft with a worn-out cover, which has lost at least some of its transparency and/or light directing functionality and therefore deteriorates the quality of the light emitted by the lighting device, is reduced, which enhances the safety of the aircraft's operation.

According to an embodiment, the at least one protrusion is provided at a first lateral end of the exterior aircraft light cover and the at least one fixing device is provided at an opposing second lateral end of the exterior aircraft light cover. Such a configuration, in which the at least one protrusion and the at least one fixing device are provided at opposing lateral ends of the exterior aircraft light cover ensures a proper fixation of the cover. The term lateral end does not necessarily refer to an outermost point of the exterior aircraft light cover. It refers to an end region of the exterior aircraft light cover in a direction of lateral extension.

In a further embodiment, the fixing device comprises a screw, allowing a fast, secure and easy fixing of the cover.

In another embodiment, the fixing device comprises at least one quick release push button fastener or a pressure lock. Employing a quick release push button fastener or a pressure lock allows an even faster fixing and releasing of cover and avoids the need of using any tools, as e.g. a screwdriver, for fixing and releasing the cover.

According to a further embodiment, at least one of the exterior aircraft light cover and the exterior aircraft light casing comprises a groove or notch, being configured for receiving a sealing element, which sealing element is provided for sealing an interface between the exterior aircraft light cover and the exterior aircraft light casing, to which the exterior aircraft light cover is attached. Said groove or notch in particular may extend circumferentially along the complete periphery of the exterior aircraft light cover and/or along the complete periphery of the exterior aircraft light casing, in order to seal the complete interface. For providing an efficient and reliable seal, said groove or notch in particular may be provided at an extension extending into the exterior aircraft light casing when the exterior aircraft light cover is arranged in a position in which it closes the exterior aircraft light casing.

The sealing element may be provided in the form of an O-ring and/or may comprise rubber material According to a further embodiment, the exterior aircraft lighting device and in particular the exterior aircraft light cover is provided with a lens, in particular a Fresnel-lens for modifying the light, which is emitted from the lighting device via the cover. The lens in particular may be integrated with the cover, which avoids the need for an additional lens minimizing the costs for production and maintenance, as the number of parts is reduced. In such a configuration, in which the lens is integrated with the cover, the lens is always changed together with the cover. This avoids any degeneration of the light emitted by the lighting device due a wear or degeneration of the lens. The lens in particular may be provided as a Fresnel lens for reducing the weight of the lens.

According to a further embodiment, the protrusion and the reception are configured for allowing the exterior aircraft light cover to pivot with respect to the exterior aircraft light casing, when the protrusion is received within the reception. Allowing the exterior aircraft light cover to pivot with respect to the casing facilitates the installation and removal of the exterior aircraft light cover, as the exterior aircraft light cover may be pivoted from its closed position, in which it is oriented parallel to the aircraft's exterior, in this way sealably closing the cover, to an open position, in which it is inclined with respect to the aircraft's exterior, before detaching it completely from the aircraft by removing the protrusion from the reception. In a particular embodiment, the protrusion and/or the reception has a rounded shape in cross-section.

According to a further embodiment, the reception is defined by a first element and a removable second element, acting together for forming the reception. Such a configuration, in which the reception is provided by two elements with at least one of the elements being removable, facilitates the maintenance and in particular the cleaning of the reception by removing the removable element for easy access to the reception. The first element in particular may be formed integral with or fixedly attached to the casing and/or the aircraft's structure. The second element may be fixable to the first element, the casing and/or the aircraft's structure by means of a screw, providing a safe and reliable, but easily movable fixation.

According to a further embodiment, the exterior aircraft lighting device comprises at least one light source for generating the light emitted by the lighting device, said light source being supported by the casing. The at least one light source in particular may comprise at least one LED, providing a reliable and efficient light source, which may be produced, installed and operated at low costs.

According to a further embodiment, the exterior aircraft light cover has an at least partially arcuate shape, in particular a shape which matches the aircraft's outer contour for optimizing the aerodynamic properties of the lighting device and the aircraft.

In an embodiment, the exterior aircraft lighting is configured as at least one of a navigation or a position light, a beacon light, an anti-collision or strobe light, a wing light, a taxi light, a landing light, or a runway turnoff light, allowing an easy and fast maintenance of the respective light.

BRIEF DESCRIPTION OF DRAWINGS

Exemplary embodiments of the invention are described in greater detail below with reference to the enclosed figures.

FIG. 7 shows a top view of an exterior aircraft lighting device according to an exemplary embodiment of the invention.

DETAILED DESCRIPTION OF THE INVENTION

Figure 1:
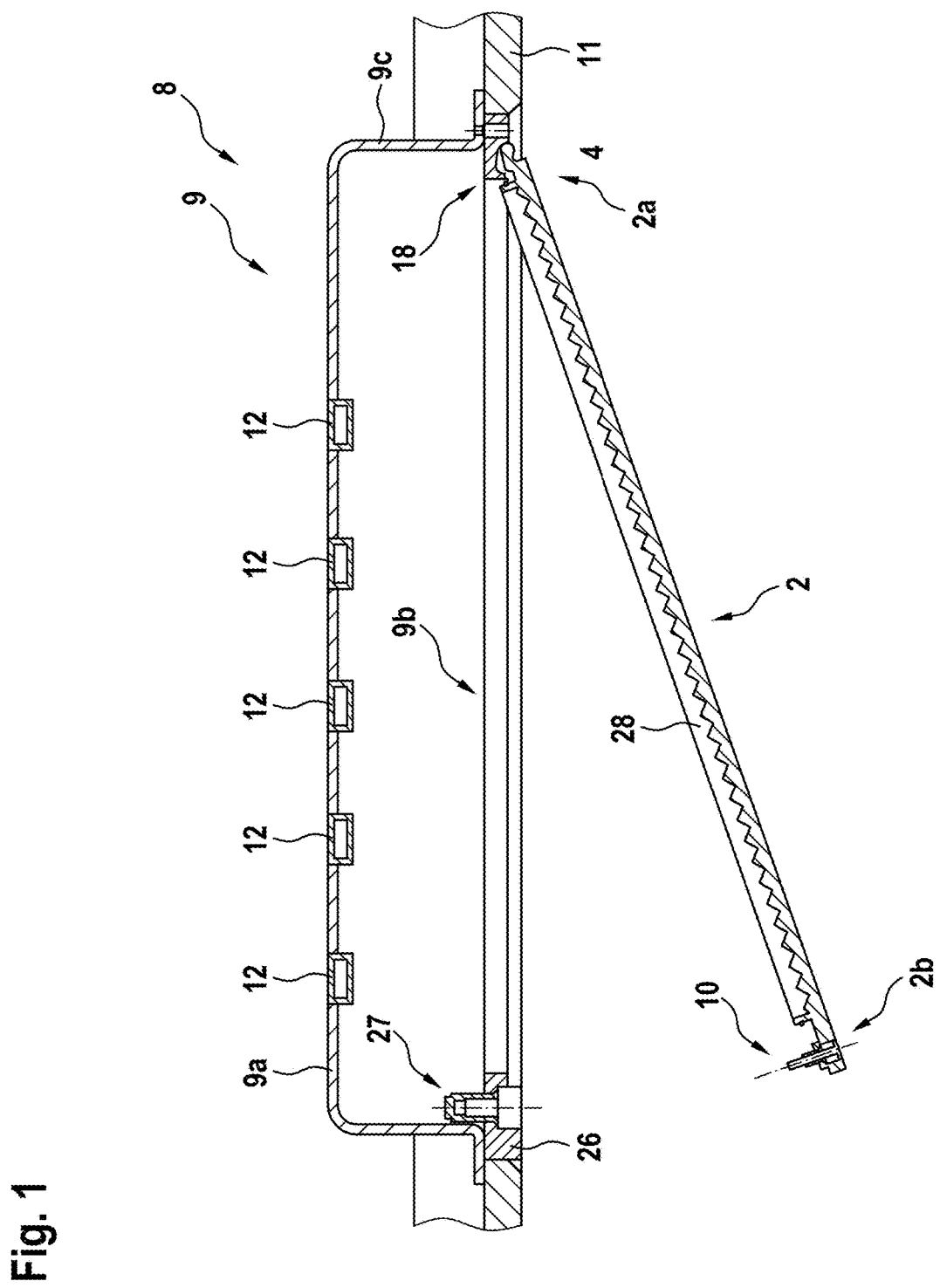
FIG. 1 shows a cross-sectional view through an exemplary embodiment of an exterior aircraft lighting device, comprising an exterior aircraft light casing attached to an aircraft's fuselage and an exterior aircraft light cover in a partially open position.
Figure 2:
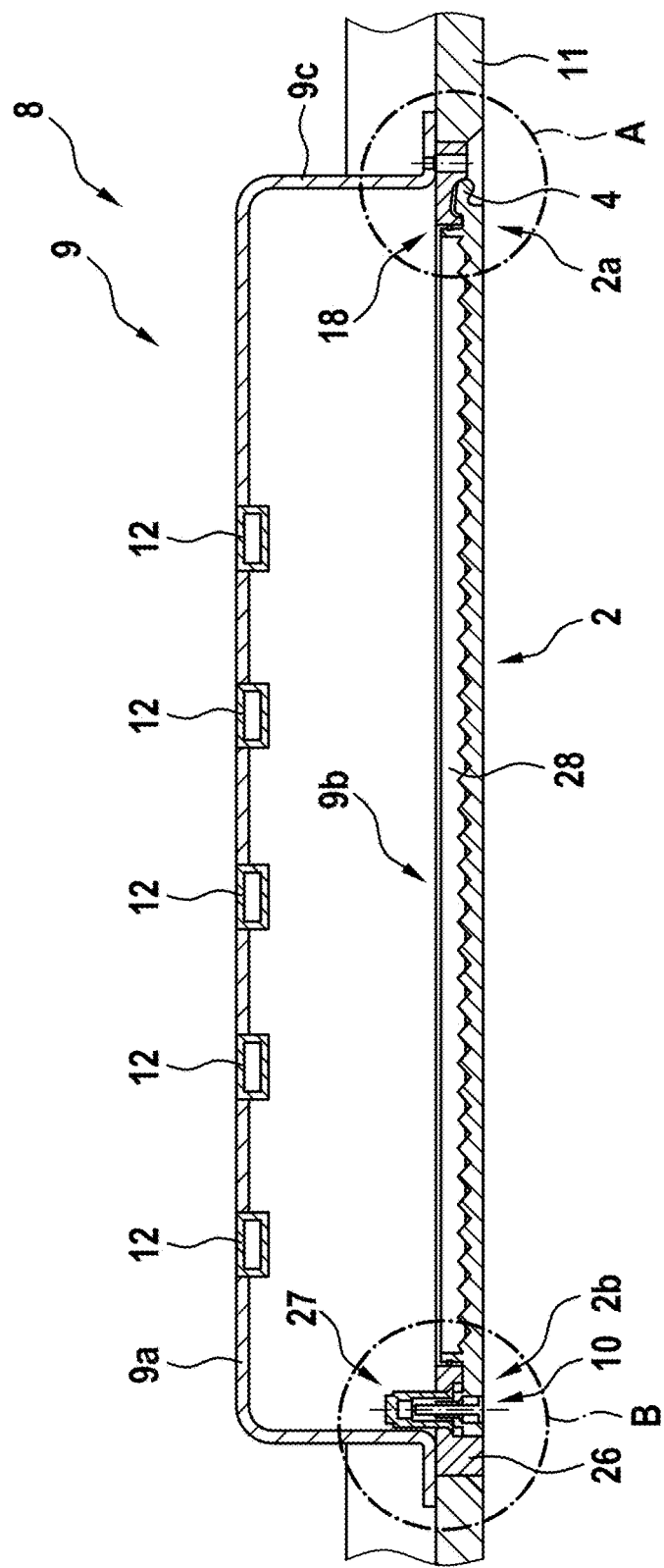
FIG. 2 shows a cross-sectional view through an exemplary embodiment of an exterior aircraft lighting device, comprising an exterior aircraft light casing attached to an aircraft's fuselage and an exterior aircraft light cover in its closed position.

FIGS. 1 and 2 respectively show a cross-sectional view through an exemplary embodiment of an exterior aircraft lighting device 8, comprising an exterior aircraft light casing 9 attached to the inside of an aircraft's structure 11.

The exterior aircraft light casing 9 comprises a rear side 9a located in the aircraft's interior, an open front side 9b facing the aircraft's outside and a circumferential side portion 9c supporting the casing 9 at the inside of the aircraft's structure 11. The exterior aircraft light casing's rear side 9a supports a plurality of light sources 12, which in particular can be provided in the form of LEDs.

The exterior aircraft light casing's open side 9b is sealably closeable by an at least partially transparent exterior aircraft light cover 2. The exterior aircraft light cover 2 in particular may be formed of transparent plastic/acrylic glass (Plexiglas®).

The exterior aircraft light cover 2 comprises at least one protrusion 4 which is formed at a first lateral end 2a of the exterior aircraft light cover 2 and which is configured to be introduced into a corresponding reception 18, formed at the aircraft's structure 11 and/or at the cover 9, for attaching the cover 2 to the aircraft's structure 11 and/or the casing 9.

The protrusion 4 and the reception 18 are respectively formed in a shape which allows the cover 2 to pivot between a position in which it is oriented parallel to the aircraft's outer contour (see FIG. 2), and a position in which the cover is inclined with respect to said contour (see FIG. 1). The point, at which the protrusion 4 is supported by the reception 18, when the protrusion 4 is received within the reception 18, acts as fulcrum of said pivoting motion, which allows an easy installation and deinstallation of the exterior aircraft light cover 2.

A fixing device 10, which may be provided in the form of a screw or a quick release push button fastener, is provided at an opposing second lateral end 2b of the exterior aircraft light cover 2. The fixing device 10 allows to removably fix said opposing second lateral end 2b to the aircraft's structure 11 and/or to the casing 9 by being introduced into a corresponding fixture receipt 27, provided at a stop 26 that is formed at the aircraft's structure 11, in order to sealably close the open side 9b of the exterior aircraft light casing 9 by means of the exterior aircraft light cover 2, as it is shown in FIG. 2.

The embodiment shown in FIGS. 1 and 2 allows an easy installation of the exterior aircraft light cover 2 by introducing the protrusion 4 into the reception 18 in a first step with the exterior aircraft light cover 2 being in a pivoted (inclined) orientation with respect to the aircraft's outer contour, as shown in FIG. 1, and pivoting the exterior aircraft light cover 2, with the protrusion 4 acting as a fulcrum, in a second step for orienting the plane of the exterior aircraft light cover 2 flushing with the outer contour of the aircraft's structure 11 and then fixing the pivotable second lateral end 2b of the exterior aircraft light cover 2 by means of the fixing device 10 in a third step for sealably closing the exterior aircraft light casing 9, as it is shown in FIG. 2. As the outer plane of the exterior aircraft light cover 2 flushes with the aircraft's exterior contour, it does not provide any working surface for the airstream that could generate forces acting on the exterior aircraft light cover 2 or cause a collection of dirt comprised in the airstream at the aircraft's outer surface.

The exterior aircraft light cover 2 is provided with a lens 28, in particular a Fresnel lens, for appropriately directing the light provided by the light sources 12 to the aircraft's exterior. The lens 28 in particular may be integrated with the exterior aircraft light cover 2 in order to reduce the number of elements.

Figure 3:
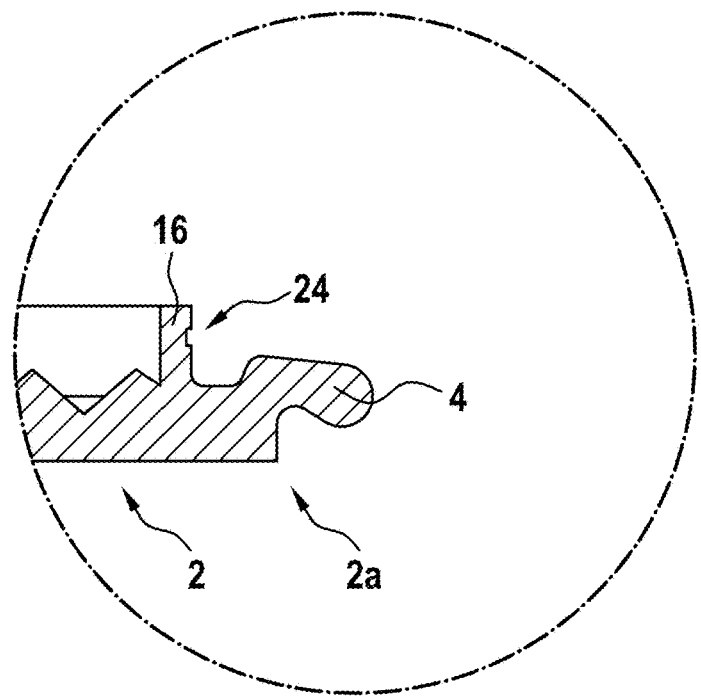
FIG. 3 shows an enlarged view of a first lateral end of the exterior aircraft light cover.

FIG. 3 shows an enlarged view of the first lateral end 2a of the exterior aircraft light cover 2, in particular illustrating the specific form of the protrusion 4 allowing the pivoting motion of the exterior aircraft light cover 2, which is illustrated in FIGS. 1 and 2.

The protrusion 4 may be a single protrusion extending basically along the entire length of the exterior aircraft light cover's first lateral end 2a. Alternatively, a plurality of protrusions 4 may be provided in some distance to each other along the length of said first lateral end 2a, with every protrusion extending only over a partial portion of the exterior aircraft light cover's first lateral end 2a.

The exterior aircraft light cover 2 of the embodiment shown in the figures further comprises an extension 16 extending basically orthogonally with respect to the plane of the exterior aircraft light cover 2 extending between the first and second lateral ends 2a, 2b. The extension 16 is provided with a circumferential notch or groove 24 configured for receiving a suitable sealing element (which is not shown in FIG. 3), e.g. a sealing ring, in particular an O-ring, for sealing the interface between the exterior aircraft light cover 2 and the exterior aircraft light casing 9 or the aircraft's structure 11, respectively, when the exterior aircraft light cover is arranged 2 in the closed position, as it is shown in FIG. 2.

Figure 4:
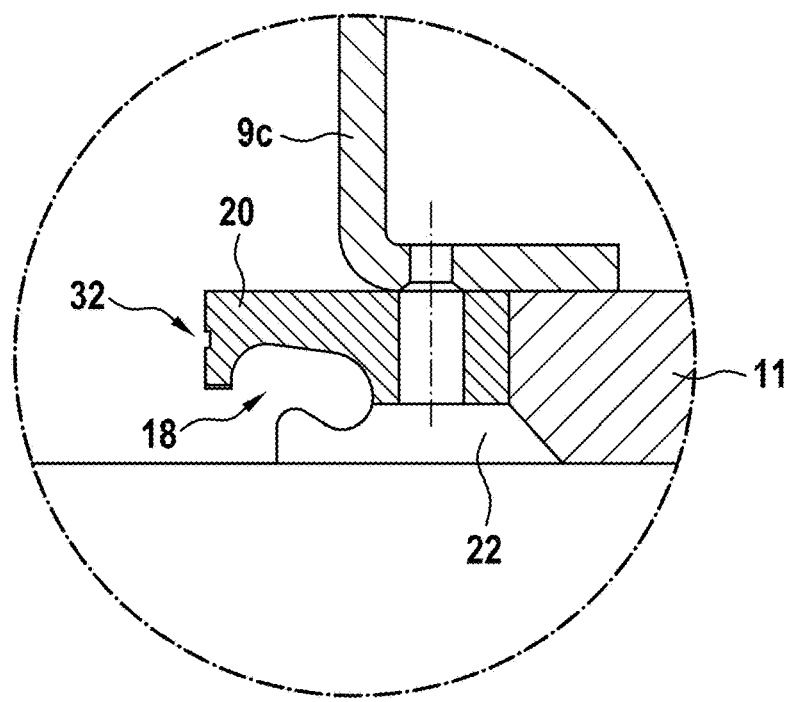
FIG. 4 shows an enlarged view of the reception which is configured for receiving the first lateral end of the exterior aircraft light cover.

FIG. 4 shows the reception 18 which is provided at the exterior aircraft lighting device's exterior aircraft light casing 9 and/or the aircraft's structure 11 for receiving the exterior aircraft light cover's protrusion 4.

In the embodiment shown in FIG. 4, the reception 18 is formed by two elements 20, 22, a first, fixed element 20, which is attached to or formed integrally with the exterior aircraft lighting device's exterior aircraft light casing 9 and/or the aircraft's structure 11 and a second, removable element 22, which is removably attached to the first element 20 and/or the aircraft's structure 11 by means of a suitable fixing means (not shown), e.g. a screw or bolt. The first and second elements 20, 22 form, in combination, a notch or groove constituting the reception 18.

Forming the reception 18 by a combination of at least two elements 20, 22, with at least one element 22 being removable, facilitates the maintenance and in particular the cleaning of the reception 18, as it provides easy access to the reception 18 by removing the at least one removable element 22.

In the embodiment shown in FIG. 4, the first element 20 is provided with a circumferential notch or groove 32, which is configured for receiving a sealing element (not shown), wherein the sealing element is configured for sealing the interface between the exterior aircraft light cover 2 and said first element 20, when the exterior aircraft light cover 2 is arranged in its closed position, as it is shown in FIG. 2.

Said notch or groove 32, which is formed at the first element 20, may be provided in addition or as an alternative to the notch or groove 24 which is formed at the exterior aircraft light cover 2, as it is shown in FIG. 3.

Figure 5:
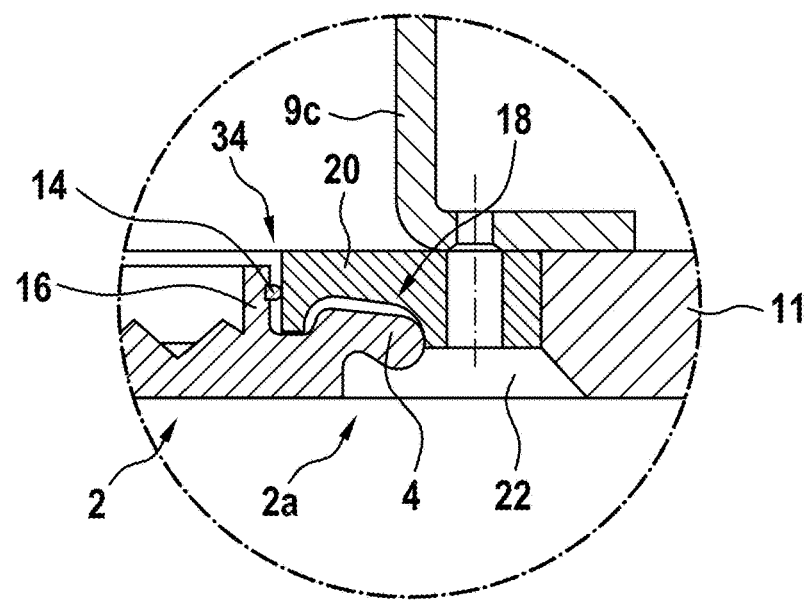
FIG. 5 shows an enlarged view illustrating the first lateral end of the exterior aircraft light cover received within the reception.

FIG. 5 shows a first lateral end portion 2a of the exterior aircraft light cover 2 in a situation in which the protrusion 4 has been introduced into the corresponding reception 18 and the exterior aircraft light cover 2 is arranged in its closed position in which it is oriented parallel to the aircraft's exterior contour (cf. area A in FIG. 2).

A sealing element 14, in particular an O-ring, is arranged between the extension 16 of the exterior aircraft light cover 2 and the first element 20 of the reception 18 for sealing the interface 34 between the exterior aircraft light cover 2 and said first element 20 in order to avoid dirt and/or moisture from intruding into the exterior aircraft light casing 9.

Figure 6:
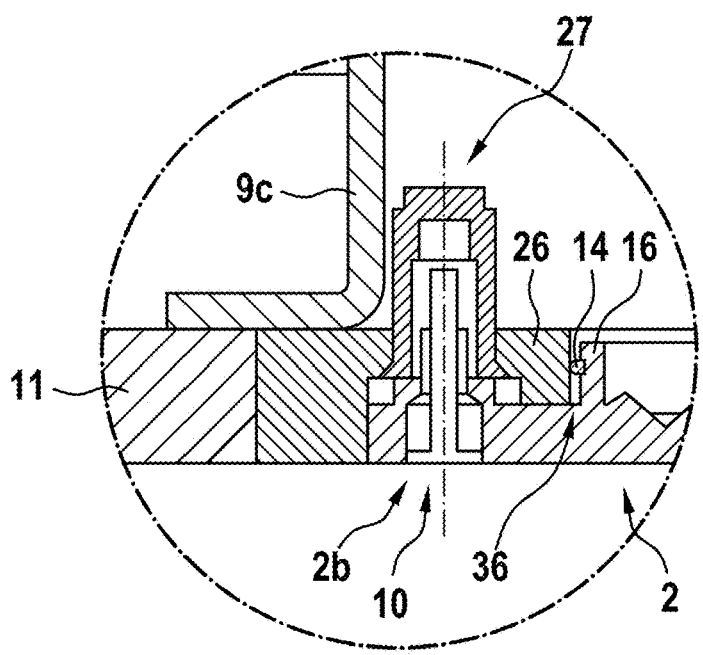
FIG. 6 shows an enlarged view of a second lateral end of the exterior aircraft light cover fixed to the fuselage.

FIG. 6 shows an enlarged view of the opposing second lateral end 2b of the exterior aircraft light cover 2 in its closed position (cf. area B in FIG. 2). When the exterior aircraft light cover 2 is arranged in said position, its second lateral end 2b abuts against the corresponding stop 26 provided at the aircraft's structure 11, with said second lateral end 2b being fixed to said stop 26 by means of the fixing device 10, in this case a quick release push button fastener, which is received within the corresponding fixture receipt 27 formed at the stop 26. As an alternative to the combination of a quick release push button fastener 10 and a corresponding fixture receipt 27, a screw, a plurality of screws or another suitable fixing structure, as e.g. a bayonet lock, may be used for fixing the second lateral end 2b to the stop 26 in order to avoid any pivoting motion of the cover 2.

The sealing device 14 (O-ring) seals the interface 36 between the stop 26 and the second lateral end 2b of the exterior aircraft light cover 2, which is arranged circumferentially along the exterior circumference of the extension 16, as is visible in FIG. 6 as well.

FIG. 7 shows a top view of an exterior aircraft lighting device 8 according to an exemplary embodiment of the invention, comprising an outer frame 30 being attached at the outside of the aircraft's structure 11 by means of a plurality of screws, bolts or other suitable fixing means 36. These fixing means 36 also fix the exterior aircraft light casing 9 of the exterior aircraft lighting device 8, which exterior aircraft light casing 9 is not visible in FIG. 7, to the aircraft's structure 11. The exterior aircraft light cover 2 is arranged inside said frame 30. The first lateral end 2a of said exterior aircraft light cover 2, which is shown on the right side of FIG. 7, is attached to the frame 30 by introducing at least one protrusion 4, which is provided at the first lateral end 2a of the exterior aircraft light cover 2, into a corresponding reception 18 provided at the frame 30, as it is illustrated in FIGS. 1, 3, and 5. The at least one protrusion 4 and the reception 18, however, are not visible in FIG. 7, as they are masked by the frame 30.

The exterior aircraft light cover 2 in particular may comprise two protrusions 4, the position of each protrusion 4 corresponding with the position of each of the fixing devices 10, i.e. being located at the same vertical position in the illustration shown in FIG. 7.

The opposing second lateral end 2b of the exterior aircraft light cover 2 is fixed by two fixing devices 10, as illustrated in more detail in FIG. 6, which allows for a fast installation and removal of the exterior aircraft light cover 2.

The exterior aircraft lighting device 8, shown in FIG. 7, has a basically rectangular shape with rounded corners. The skilled person, however, easily understands that embodiments if the invention may be employed in combination with other shapes, in particular including circular, elliptical, triangular and quadratic shapes, as well.

Furthermore, in the embodiment shown in the enclosed Figures, the exterior aircraft light cover 2 flushes with the aircraft's outer contour. The application, however, similarly may be applied to an exterior aircraft lighting device 8 comprising a dome-like cover extending from the aircraft's outer contour for allowing radiating the light over a large angular range of up to 180°.

While the invention has been described with reference to exemplary embodiments, it will be understood by those skilled in the art that various changes may be made and equivalents may be substituted for elements thereof without departing from the scope of the invention. In addition many modifications may be made to adopt a particular situation or material to the teachings of the invention without departing from the essential scope thereof. Therefore, it is intended that the invention not be limited to the particular embodiment disclosed, but that the invention include all embodiments falling within the scope of the following claims.

The invention claimed is:

1. An exterior aircraft light cover comprising:
   at least one protrusion provided at a lateral end of the exterior aircraft light cover, wherein the at least one protrusion is configured to be introduced into a corresponding reception provided at an exterior aircraft light casing and wherein the protrusion is formed for allowing the cover to pivot, with the protrusion providing a fulcrum, when the protrusion is introduced into the reception; and
   at least one fixing device, which is provided in a pivotable portion of the cover and which is configured for removably fixing said pivotable portion to the casing for preventing a pivoting motion thereof;
   wherein the at least one fixing device comprises a quick release push button fastener.

2. The exterior aircraft light cover of claim 1, wherein the protrusion is provided at a first lateral end of the exterior aircraft light cover and wherein the fixing device is provided at an opposing second lateral end of the exterior aircraft light cover.

3. The exterior aircraft light cover of claim 1, wherein the cover comprises a groove or notch for receiving a sealing element, in particular a groove or notch for receiving an O-ring.

4. The exterior aircraft light cover of claim 1, wherein the cover further includes a lens.

5. The exterior aircraft light cover of claim 4, wherein the lens is integral with the cover.

6. The exterior aircraft light cover of claim 4, wherein the lens is a Fresnel lens.

7. The exterior aircraft light cover of claim 1, wherein the cover has an arcuate shape that which matches an aircraft's outer contour.

8. An exterior aircraft lighting device comprising:
   an exterior aircraft light casing having an open side and being configured to be fixed to an aircraft's structure; and
   an at least partially transparent exterior aircraft light cover according to claim 1, which is configured for being arranged at the open side for sealably closing the exterior aircraft light casing;
   wherein the exterior aircraft light casing is provided with at least one reception which is configured for receiving the cover's at least one protrusion, the reception in particular having the form of a notch or groove.

9. The exterior aircraft lighting device of claim 8, wherein the protrusion and the reception are configured for allowing the cover to pivot with respect to the exterior aircraft light casing, when the protrusion is received within the reception.

10. The exterior aircraft lighting device of claim 8, wherein the reception is defined by a first element and a removable second element.

11. The exterior aircraft lighting device of claim 8, wherein the exterior aircraft light casing comprises a groove or notch for receiving a sealing element, in particular a groove or notch for receiving an O-ring.

12. The exterior aircraft lighting device of claim 8, further comprising a sealing element, in particular an O-ring, for sealing an interface between the cover and the casing.

13. The exterior aircraft lighting device of any of claim 8, further comprising at least one light source, in particular at least one LED, which is supported by the casing.

14. The exterior aircraft lighting device of claim 8, wherein the transparent cover has an arcuate shape.

15. The exterior aircraft lighting device of claim 8, wherein the transparent cover has an arcuate shape matching an aircraft's outer contour.

16. The exterior aircraft lighting device of claim 8, wherein the exterior aircraft lighting device is configured as a navigation or position light, a beacon light, an anti-collision or strobe light, a wing light, a taxi light, a landing light, or a runway turnoff light.

* * * * *